May 2, 1961     J. D. EISLER     2,982,175
TRACE-SHIFTING PHOTOGRAPHIC RECORDER
Filed Dec. 30, 1957
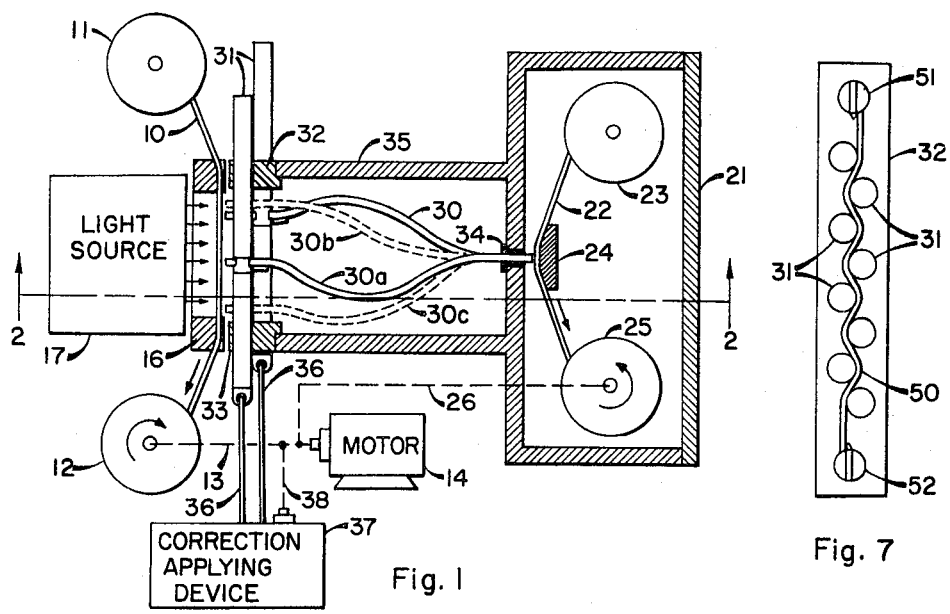
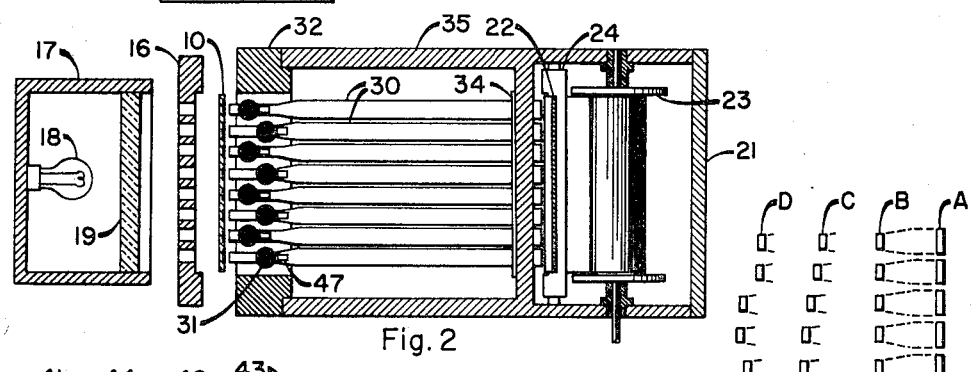
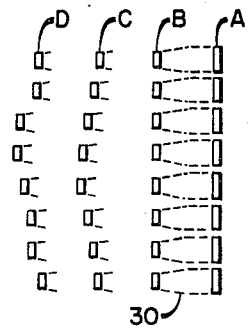
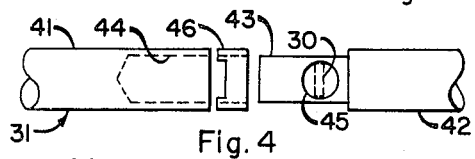
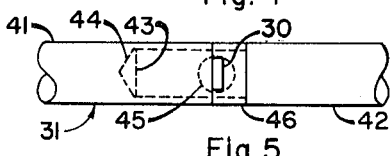
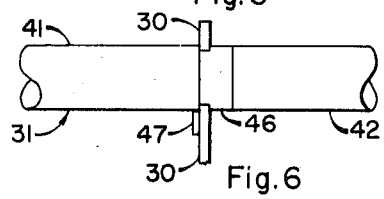
INVENTOR:
JOSEPH D. EISLER
BY Newell Pottof
ATTORNEY United States Patent Office 2,982,175
Patented May 2, 1961

2,982,175

TRACE-SHIFTING PHOTOGRAPHIC RECORDER

Joseph D. Eisler, Tulsa, Okla., assignor to Pan American Petroleum Corporation, Tulsa, Okla., a corporation of Delaware Filed Dec. 30, 1957, Ser. No. 705,938

6 Claims. (Cl. 88—24)

This invention relates to recorders and is directed particularly to the recording in variable-density form of seismic waves received in seismic geophysical surveying. More specifically, the invention is directed to an apparatus, including an optical system, for translating one multiple-trace variable-density record into another multiple-trace variable-density record, with the traces shifted relative to each other so as to compensate for the various causes of time differences between corresponding events on the different traces.

The displaying of seismic data in the form of variable-density record cross-sections has assumed considerable importance. The presentation is in a conveniently compact form and the over-all appearance of the cross-section somewhat resembles the actual subsurface layering of the earth. Variable-density field records, however, are rarely suitable for such cross-section displays until some of the traces have been shifted relative to others to eliminate the time differences of corresponding events on the various traces. As is well known, such time differences may be either variable or fixed, in the sense that they either do or do not vary with time along the field record. Thus, time differences due to normal move-out, which is the effect of having various seismometers at different distances from a shot point rather than located at the shot point, vary with time along a record, while time differences due to variations in weathering, elevation, and the like may change from trace to trace of a record but are constant throughout any one record. Time differences between successive records made at a given location may arise because of changes in shot depth or datum plane elevation.

The projection or contact printing of one field-record trace at a time onto a photographic paper or film, with appropriate shifting of each trace before and during the printing, is time-consuming. Furthermore, imperfections of the field film such as scratches, fingerprints, or other blemishes are also transferred to and degrade the appearance of the resulting cross-section. Converting the field record into electrical signals for correction and re-recording involves unnecessary complexities in the apparatus.

It is accordingly a primary object of my invention to provide a novel and improved system for photographically printing from a multiple-trace variable-density field record, a corresponding multiple-trace variable-density record with the time differences of corresponding events on the various traces removed. A further object is to provide such a system for photographically printing a corrected multiple-trace variable-density record from an uncorrected record of the same form, wherein all of the traces are printed simultaneously. A still further object is to provide a system wherein such printing is accomplished in a way which avoids transferring to the final record minor imperfections, such as scratches and the like, appearing on the field record. Still another object is to provide a system for converting variable-area traces to variable-density traces with or without relative shifting of some of the traces. Other and further objects, uses, and advantages of the invention will become apparent as the description proceeds.

Briefly stated, the foregoing and other objects are accomplished by a system wherein a multiple-trace variable-density or variable-area field record and the film or paper on which it is to be photographically printed, with the traces shifted in varying amounts, are both transported along two spaced paths simultaneously. Extending from each trace of the field record to the position on the film where that trace is to appear is an elongated flexible light-channeling member, which may be briefly called a "light pipe." An area of the field film is illuminated substantially uniformly by light from a suitable light source. The light beam passing through each variable-density or variable-area trace at the location of the corresponding light pipe is received and carried by the pipe to the film being printed. Accordingly, as the record and the film are moved past opposite ends of the light-pipe members, the light passing through each pipe is modulated or varied in intensity exactly in accordance with the trace density or area variations of the field record, and it therefore produces a correspondingly varying exposure of the film strip. The flexibility of the light pipes allows shifting of one end of each pipe along the trace being scanned by it by the appropriate amount to produce the trace-shifting effect required to align simultaneous events on the traces of the final record. In other words, the exposures of the film traces at any one instant of record time are controlled by the densities or areas of the corresponding field-record traces at any desired relative positions along the various traces within the illuminated area and within the limits of the shifting mechanism by which the ends of the light pipes are moved.

This will be better understood by reference to the accompanying drawing forming a part of this application and illustrating a typical embodiment of the invention.

In the drawing,

Figure 1 is a plan view, with some parts in cross-section, of a typical embodiment of the invention;

Figure 2 is a cross-section view of the system of Figure 1, along the lines 2—2 with certain portions spread apart as in an exploded view for showing their form and relationships more clearly;

Figure 3 shows diagrammatically the ends of the light-channeling members in various operating positions;

Figures 4, 5, and 6 are varying views of the means for holding and accurately shifting the ends of the light-channeling members; and Figure 7 is a view of a means for applying friction to the shifting means to prevent undesired movements thereof.

Referring now to the drawings, and particularly to Figures 1 and 2 thereof, a variable-density field record 10 bearing a number of parallel traces of seismic data is drawn from a supply spool 11 to a take-up spool or reel 12, suitably driven by a connection 13 from an electric motor 14 or the like. Between the reels 11 and 12 the record film 10 passes over a guide 16 and is substantially uniformly illuminated over a substantial area of the record by a light source 17. As is shown in Figure 2, this source may comprise an ordinary light bulb 18 and a diffusing or ground glass 19 through which the light passes before striking the film 10. Preferably the guide 16 is provided with slots centered over the variable-density traces, as appears in this figure, the dividers between slots coinciding with the spaces between the respective traces on the record 10.

Within a light-tight housing 21 spaced from the record 10 at a suitable distance an unexposed film strip 22 is drawn from a supply spool 23 across a guide 24 to a take-up spool 25 by a suitable driving connection 26 to the motor 14.

From each variable-density trace on the record 10 to the position on the film 22 where that trace is to be recorded extends one of a plurality of light-channeling members 30 which may be briefly termed light pipes. These pipes are thin strips of a highly transparent material such as the synthetic acrylic resin sold under the trademark "Lucite." Each pipe 30 is curved, being somewhat longer than the spacing between the film 10 and the film 22, so that without altering its spacing from the record the end nearest the record 10 may be moved along the direction of the corresponding trace to any of the several positions shown as 30a, 30b, and 30c in Figure 1, or any intermediate positions therebetween. Preferably each pipe curves in the opposite direction to the ones adjacent, to minimize possible contacts and mutual interference of motion. The end of each light pipe 30 is accurately held by a guide rod 31 very close to the corresponding variable-density trace to be scanned and is accurately movable along the direction of the trace by sliding of the guide rod 31 lengthwise in the guide bearings 32 and 33. The other ends of the various light pipes 30 opposite those held by the guide rods 31 are held fixed by a clamp 34 and pass through a narrow opening in the housing 21 substantially into contact with the face of the film 22 along a straight line extending transversely across the width of the film. A housing 35 surrounds the light pipes 30, supporting the bearing members 32 and 33 in fixed relation to the housing 21 and excluding stray light from entering the system. From each guide rod 31 a suitable connection 36, such as a wire or cord extends to a correction-applying device 37, actuated from the motor 14 by a driving connection 38, it being understood that the lengthwise movements of the guides 31 are thereby correlated with the movements of the record 10 and the film 22.

It is believed that the operation of this embodiment of the invention is now apparent and can be easily understood from Figure 3. The film 22 moves at a speed that is maintained as nearly constant as possible. Light from the source 17 passes through each of the variable-density traces of the film 10 and enters the end of the corresponding light pipe 30 at the position of the light pipe end, as determined by the slide 31 by which it is held. The light passing along the pipe is thus modified in intensity in accordance with the density or area variations of the record 10 and exposes the moving film 22 inversely as the densities or opaque areas of the record 10. The ends of all the light pipes in contact with the film 22 form a straight line across the film, as indicated at A in Figure 3, while the other ends of the various light pipes 30 facing the film 10 may be held by guides 31 in positions shown as the line B for a very deep reflecting interface for which the normal move-out is substantially zero. For reflections from shallower interfaces where the move-out is substantial, the ends of the light pipes 30 facing film 10 may be moved progressively by the guides 31 to the positions illustrated in line-up C.

The line-ups B and C correspond to the positions of the scanning ends of various light pipes 30, as viewed from the position of light source 17, if no corrections are required for weathering and elevation differences along the seismometers of a spread. If in addition such corrections are required, the line-up C may be modified to some irregular pattern such as line-up D, which corresponds to C with additional fixed displacements in accordance with the various fixed corrections needed at the respective seismometer positions. As all of these corrections are such as will normally be supplied by the device 37, the details of which form no part of the present invention as they are quite well-known in the art (see U.S. Patent 2,243,730 issued to L. G. Ellis, for example, where bars 16 correspond to wires 36 here), further detailed description is believed unnecessary except to point out that even when the scanning ends of the light pipes 30 form the irregular pattern D, the other ends of the pipes form the straight line A extending across the film 22. Accordingly, the densities of the various traces at any instant of record time on the film 22 may correspond inversely to the densities at quite different times on the various traces of the field film 10. In this manner the effect of shifting of the various traces of the field record 10 is accomplished in printing them on the film 22.

In Figures 4, 5, and 6 are shown enlarged views of some of the construction details of a preferred form of guide member 31. Thus, as appears in Figure 4 the guide member 31 is preferably formed in two pieces 41 and 42, the piece 42 having a reduced diameter pin or end portion 43 which makes a press fit with a socket 44 drilled in the end of piece 41. It will be noted in Figure 2 that the ends of the light pipes 30 closest the film 10 are of somewhat reduced width. Through the pin 43 of the rod portion 42 is drilled a hole 45 of a diameter approximately equal to this width. The dotted outline 30 of Figure 4 shows the position of the narrow part of a light pipe 30 in this hole. Adapted to fit over the pin 43 and hold the light pipe 30 in this position is a cylindrical spacer 46 having a milled slot on its side to accommodate the pipe 30.

Figure 4 shows the various parts in separated position, while Figure 5 is the same view with the parts pressed together and the light pipe 30 extending therethrough. Figure 6 is the same as Figure 5 rotated ninety degrees around the axis of the rod 31. As appears in Figure 6, each light pipe 30 is preferably provided with a small block 47 of similar plastic material cemented to the side thereof, the block 47 determining the amount by which the light pipe 30 projects through the guide 31. The tendency of the light pipe, curved as at 30a, to straighten itself provides a thrust which holds the block 47 against the side of the guide rod 31.

This thrust also tends to move the guide rods 31 lengthwise in some cases, if such movement is permitted by the connections 36 being flexible. To provide a definite restraining force and frictional retardation to prevent this movement, a modification as in Figure 7 may be provided. In order to permit the spacing of the guide rods 31 to match the spacing of the traces on the film 10, they are ordinarily staggered in two spaced parallel rows in the bearing blocks 32 and 33. To provide some frictional drag so that a positive driving action of the device 37 is required to move each rod 31, a thin flat strip of spring steel 50 is interwoven between the successive rods 31 and anchored at its ends by the screws 51 and 52 to one of the guide bearing members such as 32. The tendency of the spring steel strip 50 to straighten itself thus provides some frictional contact between it and the sides of the various rods 31 and of the rods in the bearing block 32.

While the film-driving reels 12 and 25 and correction-applying device 37 are shown as driven by only the rudimentary connecting means 13, 26, and 38, it is to be understood that, if desired, these may include varying connections so that the proportionality of motion between the record 10 and the film 22 is such as to convert from a linear time scale on the record 10 to a scale that is linear in depth on the film 22, in accordance with some chosen function of time and depth. It should also be noted that the movable ends of the light pipes 30 and their guides 31 may be made to face the film 22 rather than the record 10. In this way, the densities at any one time on the field record 10 are transferred to different times on the film 22, but the effective shifting of the traces is the same. Furthermore, if desired, both ends of the light pipes 30 may be made movable, one end having the fixed or static corrections applied thereto, while the other is movable in accordance with the varying corrections needed for normal move-out, which changes with time along the records.

As an example of the application of the invention disclosed herein the following are some of the dimensions of an instrument which has been constructed for practical use: Twelve traces are recorded per inch of record width, so that the trace spacing is about .083 inch. The light pipes 30 are each about 3½ inches long and .012 inch thick. Their width at the scanning end is about .045 inch and at the printing end next to the film 22 about .073 inch, making a trace width of about .075 inch. The guide rods 31 are about 6 inches in length and .109 inch in diameter. The stiffness of the light pipes 30 in their width dimension is sufficient to prevent the rods 31 from turning.

It will be apparent that upon normal development the film 22 is reversed in density with respect to the field record 10; that is, if record 10 is regarded as a positive, the film 22 is a negative. In normal use this is desirable, as a number of corrected records 22, after processing, are assembled in order and spliced side by side for contact printing of a complete cross-section on wide paper or film. The final print will thus have the same relationship of density to wave form as the original record 10. If for any reason it is desired to do so, this relationship can be changed by giving the film 22 a reversal development, assuming it to be a type adaptable to such processing. It then becomes a positive film, and a print of it will be negative with respect to original record 10.

The invention has been described for simultaneously printing a number of parallel variable-density or variable-area traces. It can also be used in a sequential system for transferring one trace at a time from the field record 10 to the film 22. For this only one light pipe 30 and guide rod 31 is required. The chief advantage is in the simplified record and film-moving components of the system, in that they can be rigidly interconnected. This eliminates the somewhat complex variable-drive means usually employed for relatively shifting the field record 10 or the film 22 during the printing of each trace.

While my invention has been described in terms of the foregoing embodiment and specific details thereof, it is to be understood that other and further modifications will now be apparent to those skilled in the art. The scope of the invention therefore should not be considered as limited to the details described, but it is properly to be ascertained from the scope of the appended claims.

I claim:

1. Apparatus for photographically printing a second multiple-trace variable-density record from a first multiple-trace variable-density or variable-area record, where some of the traces of said second record are to be shifted lengthwise relative to others as compared with their positions on said first record, said apparatus comprising means for moving both of said records lengthwise along two spaced paths, a plurality of elongated flexible light-channeling members extending between said paths and equal in number to the traces to be printed, one end of each of said members extending from the position of a corresponding trace of said first record to the position where said trace is to be printed on said second record, means for illuminating an area of said first record so that light passes through each of said multiple traces, is modulated by the instantaneous opaque area of density thereof, enters one end of the corresponding one of said members, passes through said member and emerges from the other end thereof to photographically expose a trace on said second record, and means driven by said record-moving means for shifting at least one end of each of said members in the direction of extension of said traces, by amounts proportioned to the relative shift of each tract with respect to other traces required to align simultaneous events on the various traces, whereby the photographic exposures of the traces on said second record at any given time are established by the instantaneous opaque areas or densities at various different times along the traces of said first record.

2. Apparatus for photographically printing a second multiple-trace variable-density record from a first multiple-trace variable-density or variable-area record, where some of the traces of said second record are to be shifted lengthwise relative to others as compared with their positions on said first record, said apparatus comprising means for moving both of said records lengthwise along two spaced paths, a plurality of flexible light-channeling members longer than the spacing between said paths and equal in number to the traces to be printed, a plurality of guide means each holding one end of one of said members close to the position of a corresponding trace of said first record and adapted for moving said end parallel to said trace, means holding the other ends of all of said members in a straight line extending across the width of, and close to, said second record, means for passing light through an area of said first record and the traces thereof into the ends of said light-channeling members held by said guide means, whereby the light entering each of said members is modulated by the instantaneous opaque area or density of each corresponding trace at the position thereon determined by the position of the corresponding said guide means, passes through said member, and photographically exposes said second record, and means coupled to said record-moving means for shifting the various ones of said guide means by amounts proportional to the relative shifting of the corresponding traces required to align simultaneous events on said traces.

3. Apparatus as in claim 2 wherein each of said guide means comprises a rod member extending parallel to the traces of said first record, and bearing means supporting all of said rod members for lengthwise movement and in staggered relationship in two spaced parallel rows.

4. Apparatus as in claim 3 wherein said rod member comprises two pieces adapted to be joined end to end by a pin on one of said pieces fitting a socket on the other of said pieces, said pin having a transverse hole therethrough of a diameter fitting the reduced width dimension of the scanning ends of said light-channeling members, and a cylindrical spacer having a milled slot on its side accommodating the reduced-width portion of said light-channeling members, the end of said socket-carrying piece cooperating with said spacer to hold said reduced-width portion with its thickness dimension parallel to the axis of said rod member and positioned in the center of said hole.

5. Apparatus as in claim 3 including also a flexible member interwoven between said two spaced rows of rod members and attached to said bearing means, said flexible member providing frictional forces to oppose said lengthwise movement.

6. Apparatus for photographically printing a second variable-density record trace from a variable-area or variable-density trace on a first record comprising means for moving both of said records lengthwise along two spaced paths, a flexible light-channeling member extending between said paths, means holding one end of said member close to said trace on said first record, means for holding the other end of said member close to the position where said trace is to be printed on said second record, means for moving at least one of said holding means and the end of said member held thereby in a direction parallel to the trace which is close to it, and means for passing light through the trace of said first record into the end of said member close to said trace, whereby light is carried by said member to its other end whence it emerges and photographically exposes said second record in proportion to the instantaneous transparency of said first record and the rate of movement of said second record.

References Cited in the file of this patent

UNITED STATES PATENTS

| | | |
|---|---|---|
| 1,751,584 | Hansell | Mar. 25, 1930 |
| 2,122,750 | Nicolson | July 5, 1938 |
| 2,431,340 | Payne | Nov. 25, 1947 |
| 2,619,873 | Ellett | Dec. 2, 1952 |
| 2,710,661 | Webster | June 14, 1955 |